(12) United States Patent
Schaedler et al.

(10) Patent No.: US 11,523,559 B2
(45) Date of Patent: Dec. 13, 2022

(54) LOW-ENERGY BLADE SYSTEM HAVING A QUICK-ATTACH MECHANISM

(71) Applicant: MTD PRODUCTS INC, Valley City, OH (US)

(72) Inventors: Axel Schaedler, Olmsted Township, OH (US); Peter J. Buchanan, Elyria, OH (US)

(73) Assignee: MTD PRODUCTS INC, Valley City, OH (US)

( * ) Notice: Subject to any disclaimer, the term of this patent is extended or adjusted under 35 U.S.C. 154(b) by 0 days.

(21) Appl. No.: 16/508,568

(22) Filed: Jul. 11, 2019

(65) Prior Publication Data

US 2019/0335655 A1  Nov. 7, 2019

Related U.S. Application Data

(62) Division of application No. 15/492,865, filed on Apr. 20, 2017, now Pat. No. 10,433,480.

(60) Provisional application No. 62/325,159, filed on Apr. 20, 2016.

(51) Int. Cl.
| | |
|---|---|
| *A01D 34/73* | (2006.01) |
| *A01D 34/67* | (2006.01) |
| *A01D 34/68* | (2006.01) |
| *A01D 101/00* | (2006.01) |

(52) U.S. Cl.
CPC ......... *A01D 34/733* (2013.01); *A01D 34/736* (2013.01); *A01D 34/67* (2013.01); *A01D 34/6806* (2013.01); *A01D 2101/00* (2013.01)

(58) Field of Classification Search
CPC .... A01D 34/73; A01D 34/733; A01D 34/736; A01D 34/68; A01D 34/6806; A01D 2101/00; A01D 34/535
See application file for complete search history.

(56) References Cited

U.S. PATENT DOCUMENTS

| | | | | |
|---|---|---|---|---|
| 2,471,367 | A * | 5/1949 | Cavaness | A01D 34/63 56/11.8 |
| 2,529,870 | A * | 11/1950 | Golasky | A01D 34/736 56/17.2 |
| 2,728,182 | A * | 12/1955 | Fulton | A01D 34/822 56/13.4 |
| 2,737,772 | A * | 3/1956 | Jacobsen | A01D 34/63 56/295 |
| 2,867,963 | A * | 1/1959 | Lawrence | A01D 34/64 56/295 |
| 2,902,814 | A * | 9/1959 | Lewis | A01D 34/63 56/13.4 |
| 3,103,094 | A * | 9/1963 | Cook | A01D 34/73 56/295 |

(Continued)

Primary Examiner — Thomas B Will
Assistant Examiner — Joan D Misa
(74) Attorney, Agent, or Firm — Wegman Hessler

(57) ABSTRACT

A low-energy blade system having a quick-change attachment for a lawn maintenance tool is provided. The low-energy blade system requires a reduced amount of energy to rotate the blade system. The blade system includes a shell, a mounting plate attached to the shell, a plurality of quick-attach mechanisms, and a separate cutting blade attachable to each of the quick-attach mechanisms. Each quick-attach mechanism allows a cutting blade to be attached to the mounting plate without the need for external tools, such as screwdriver, wrench, ratchet, or the like.

7 Claims, 12 Drawing Sheets

(56) References Cited

U.S. PATENT DOCUMENTS

| | | | | |
|---|---|---|---|---|
| 3,320,732 A | * | 5/1967 | Kirk | A01D 34/736 56/295 |
| 3,320,733 A | * | 5/1967 | Kirk | A01D 34/63 56/295 |
| 3,507,104 A | * | 4/1970 | Kline | A01D 34/733 56/295 |
| 3,604,189 A | * | 9/1971 | Harer | A01D 34/664 56/295 |
| 4,407,112 A | * | 10/1983 | Shepherd | A01D 43/077 56/13.4 |
| 4,450,673 A | * | 5/1984 | Hutchison | A01D 34/005 56/13.4 |
| 5,019,113 A | * | 5/1991 | Burnell | A01D 34/733 56/17.5 |
| 5,129,217 A | * | 7/1992 | Loehr | A01D 42/005 56/13.6 |
| 5,184,451 A | * | 2/1993 | Savipakka | A01D 34/82 56/17.5 |
| 5,791,131 A | * | 8/1998 | Hill | A01D 34/733 56/229 |
| 6,935,095 B1 | * | 8/2005 | Sluder | A01D 34/733 56/17.5 |
| 7,062,898 B2 | * | 6/2006 | Sarver | A01D 43/06 56/320.1 |
| 7,299,613 B2 | * | 11/2007 | Samejima | A01D 34/005 56/320.1 |
| 7,458,199 B2 | * | 12/2008 | Sarver | A01D 43/06 56/320.1 |
| 7,490,459 B2 | * | 2/2009 | Thompson | A01D 34/733 29/402.03 |
| 7,617,665 B2 | * | 11/2009 | Yamashita | A01D 42/005 56/320.2 |
| 7,685,799 B2 | * | 3/2010 | Samejima | A01D 34/005 56/320.1 |
| 7,743,478 B2 | * | 6/2010 | Thompson | A01D 34/733 29/402.03 |
| 8,510,959 B2 | * | 8/2013 | Whitenight | A01D 34/733 30/276 |
| 8,631,550 B2 | * | 1/2014 | Janikowski | A01D 34/001 29/275 |
| 8,893,461 B2 | * | 11/2014 | Nikkel | A01D 45/10 56/255 |
| 8,931,248 B2 | * | 1/2015 | Eavenson, Sr. | A01D 34/63 56/17.5 |
| 8,935,909 B2 | * | 1/2015 | Eavenson, Sr. | A01D 34/733 56/255 |
| 9,338,942 B2 | * | 5/2016 | Eavenson, Sr. | A01D 34/733 |
| 9,480,201 B2 | * | 11/2016 | Maruyama | A01D 34/82 |
| D795,299 S | * | 8/2017 | Cmich | D15/17 |
| D795,300 S | * | 8/2017 | Cmich | D15/17 |
| D797,530 S | * | 9/2017 | Cmich | D8/8 |
| 9,930,829 B2 | * | 4/2018 | Schaedler | A01D 34/003 |
| 10,172,282 B2 | * | 1/2019 | Svensson | A01D 34/733 |
| 10,212,880 B2 | * | 2/2019 | Cmich | A01D 34/66 |
| 10,327,384 B2 | * | 6/2019 | Johansson | A01D 34/64 |
| 2002/0066263 A1 | * | 6/2002 | Megli | A01D 34/736 56/295 |
| 2004/0093842 A1 | * | 5/2004 | Cooper | A01D 34/736 56/295 |
| 2006/0168933 A1 | * | 8/2006 | Hill | A01D 34/73 56/295 |
| 2006/0179809 A1 | * | 8/2006 | Sarver | A01D 43/06 56/320.1 |
| 2007/0163124 A1 | * | 7/2007 | Kenny | A01D 34/73 30/165 |
| 2008/0072555 A1 | * | 3/2008 | Samejima | A01D 34/005 56/6 |
| 2008/0277127 A1 | * | 11/2008 | Dixon | A01D 34/733 172/552 |
| 2010/0101201 A1 | * | 4/2010 | Yanke | A01D 34/733 56/295 |
| 2011/0194885 A1 | * | 8/2011 | Whitenight | A01D 34/733 403/11 |
| 2012/0110970 A1 | * | 5/2012 | Blarek | A01D 34/73 56/295 |
| 2012/0318114 A1 | * | 12/2012 | Esain Eugui | A01D 34/733 83/651 |
| 2013/0205736 A1 | * | 8/2013 | Maruyama | A01D 34/82 56/12.9 |
| 2013/0327008 A1 | * | 12/2013 | Eavenson, Sr. | A01D 34/733 56/295 |
| 2016/0081269 A1 | * | 3/2016 | Gottinger | A01D 34/733 56/17.5 |
| 2016/0278287 A1 | * | 9/2016 | Kasai | A01D 34/736 |
| 2016/0278289 A1 | * | 9/2016 | Kasai | A01D 34/736 |
| 2016/0345490 A1 | * | 12/2016 | Schaedler | A01D 34/003 |
| 2016/0353659 A1 | * | 12/2016 | Schaedler | A01D 42/06 |
| 2017/0006776 A1 | * | 1/2017 | Svensson | A01D 34/733 |
| 2017/0332549 A1 | * | 11/2017 | Ladd, Jr. | A01D 34/733 |
| 2017/0367257 A1 | * | 12/2017 | Cmich | A01D 34/66 |
| 2017/0367260 A1 | * | 12/2017 | Sasaki | A01D 34/733 |

* cited by examiner

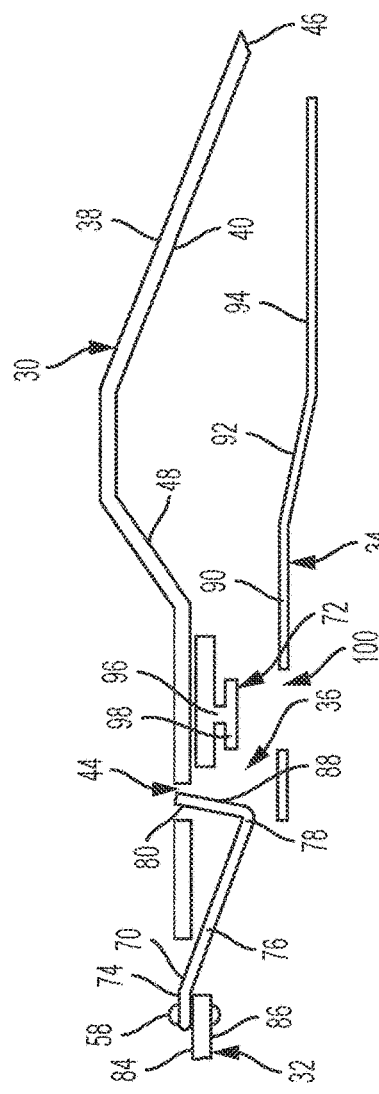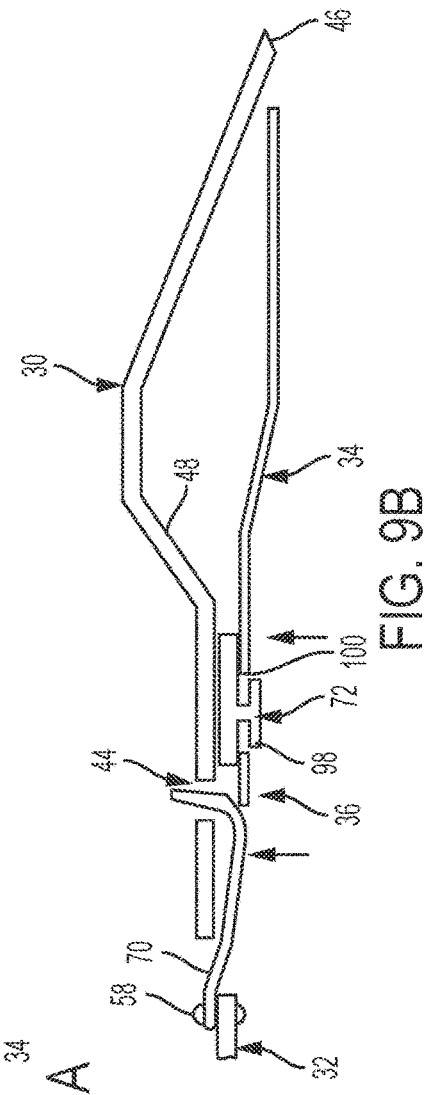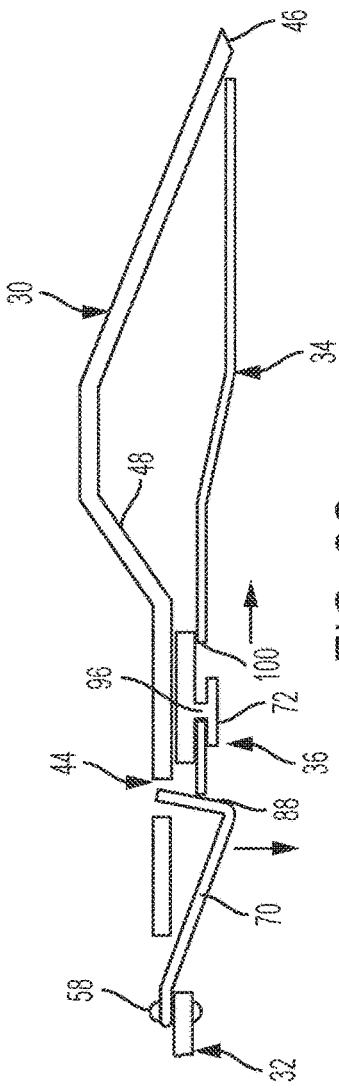

LOW-ENERGY BLADE SYSTEM HAVING A QUICK-ATTACH MECHANISM

FIELD OF THE INVENTION

This application claims the benefit of U.S. Provisional Application No. 62/325,159, filed Apr. 20, 2016, and U.S. Non-Provisional application Ser. No. 15/492,865, filed Apr. 20, 2017, the entire disclosures of which are hereby incorporated herein by reference.

BACKGROUND OF THE INVENTION

Typical walk-behind lawn mowers and riding mowers utilize an engine or other power supply to rotate one or more mower blades. The mower blades are typically formed by stamping a thick metal sheet in order to form an elongated metal blade. These thick, heavy blades rotate at high speeds, which requires significant torque to maintain such high rotational speeds of the blade(s). As a result, large engines—typically in the form of a combustion engine—are attached to a mower deck or a mower frame, and these large engines are needed to produce the high torque requirements for rotating the heavy blades. The combination of the running engine and rotation of the cutting blade within the mowing deck is often quite loud, requiring hearing protection during operation of the mowers. A need therefore exists for a lawn mower cutting blade system that requires less torque and/or energy to rotate the cutting blade system.

BRIEF SUMMARY OF THE INVENTION

In one aspect of the present invention, a low-energy blade system for a lawn maintenance tool is provided. The blade system includes a shell having an upper surface and a lower surface. A mounting plate is attached to said lower surface of the shell. A plurality of cutting blades are releasably attachable to the mounting plate. A plurality of quick-attach mechanisms are operatively connected to said mounting plate, wherein each of the cutting blades is operatively connectable to one of the quick-attach mechanisms.

Advantages of the present invention will become more apparent to those skilled in the art from the following description of the embodiments of the invention which have been shown and described by way of illustration. As will be realized, the invention is capable of other and different embodiments, and its details are capable of modification in various respects.

BRIEF DESCRIPTION OF SEVERAL VIEWS OF THE DRAWINGS

These and other features of the present invention, and their advantages, are illustrated specifically in embodiments of the invention now to be described, by way of example, with reference to the accompanying diagrammatic drawings, in which:

FIG. 9A illustrates a first step in attaching a cutting blade to the blade system shown in FIG. 3;

FIG. 9B illustrates a second step in attaching a cutting blade to the blade system shown in FIG. 3;

FIG. 9C illustrates a third step in attaching a cutting blade to the blade system shown in FIG. 3;

Figure 1:
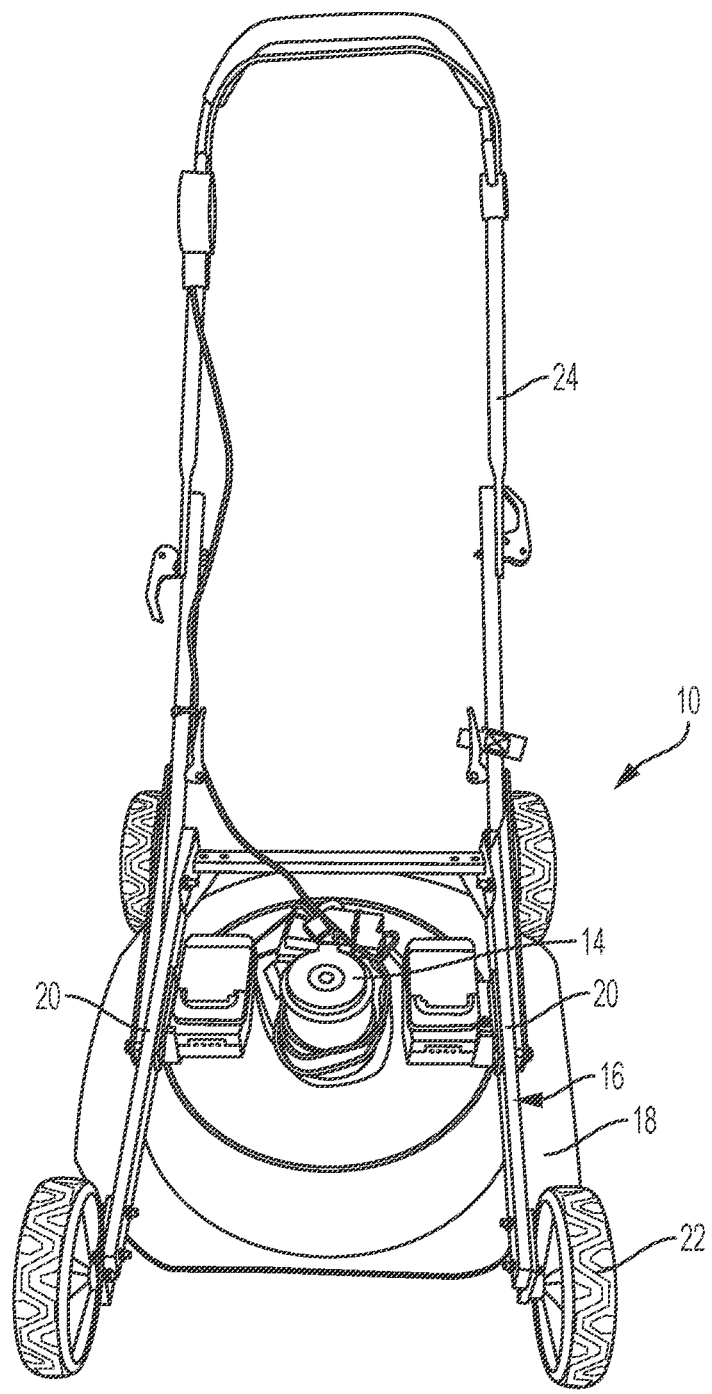
FIG. 1 is a top view of a lawn maintenance tool.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION OF THE PREFERRED EMBODIMENT

Figure 2:
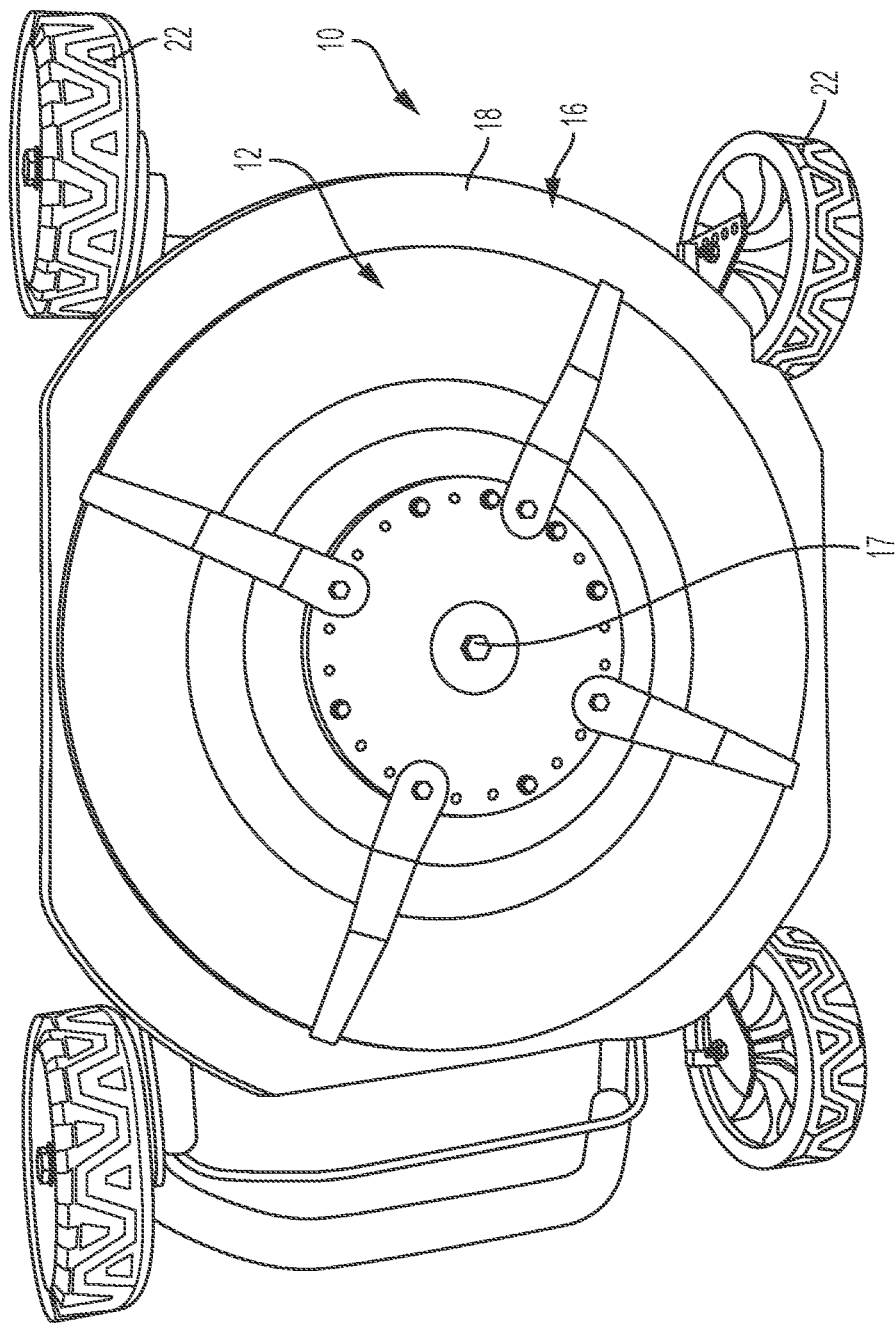
FIG. 2 is a bottom view of the lawn maintenance tool shown in FIG. 1.
Figure 3:
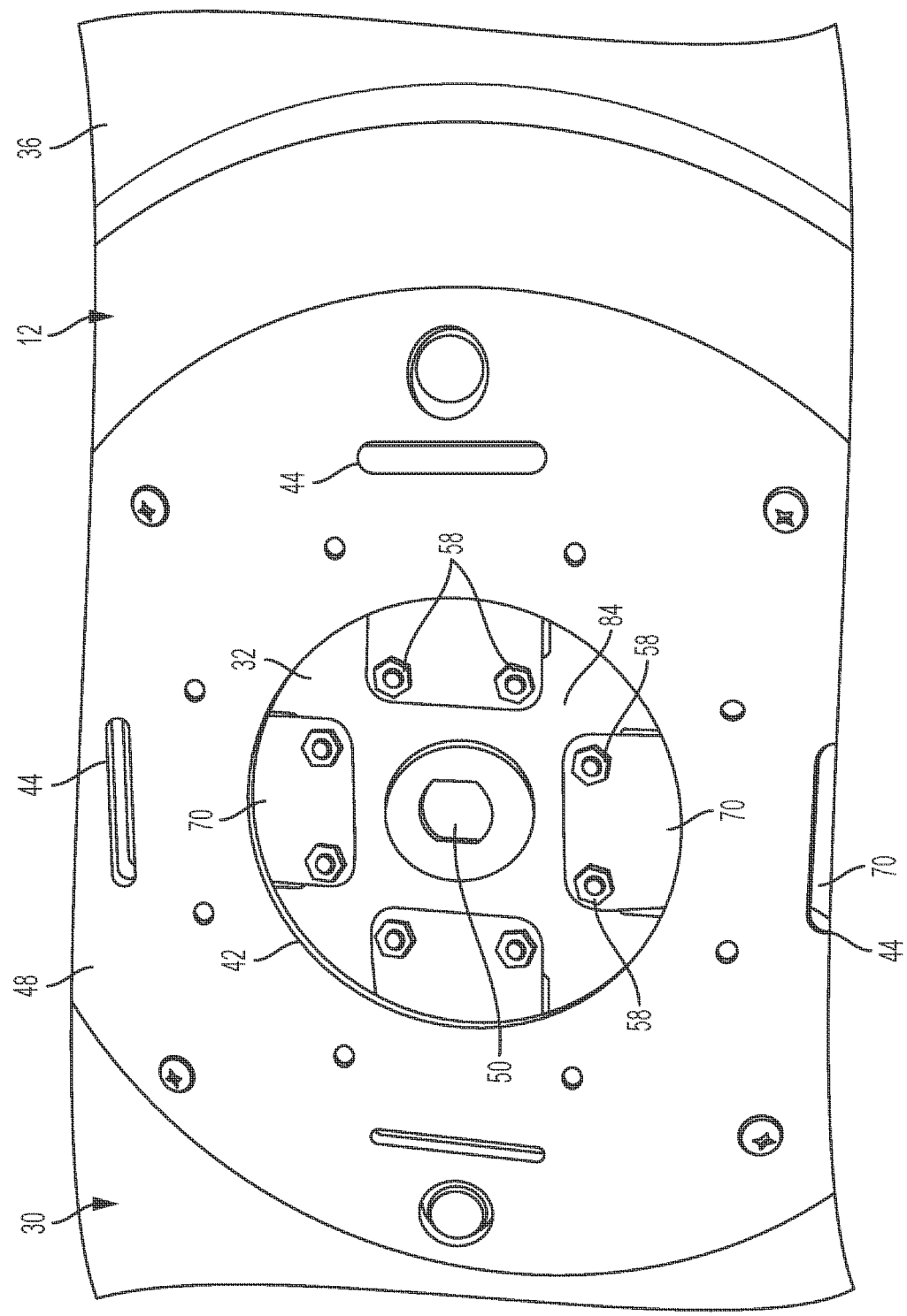
FIG. 3 is a top view of a portion of a low-energy blade system.
Figure 4A:
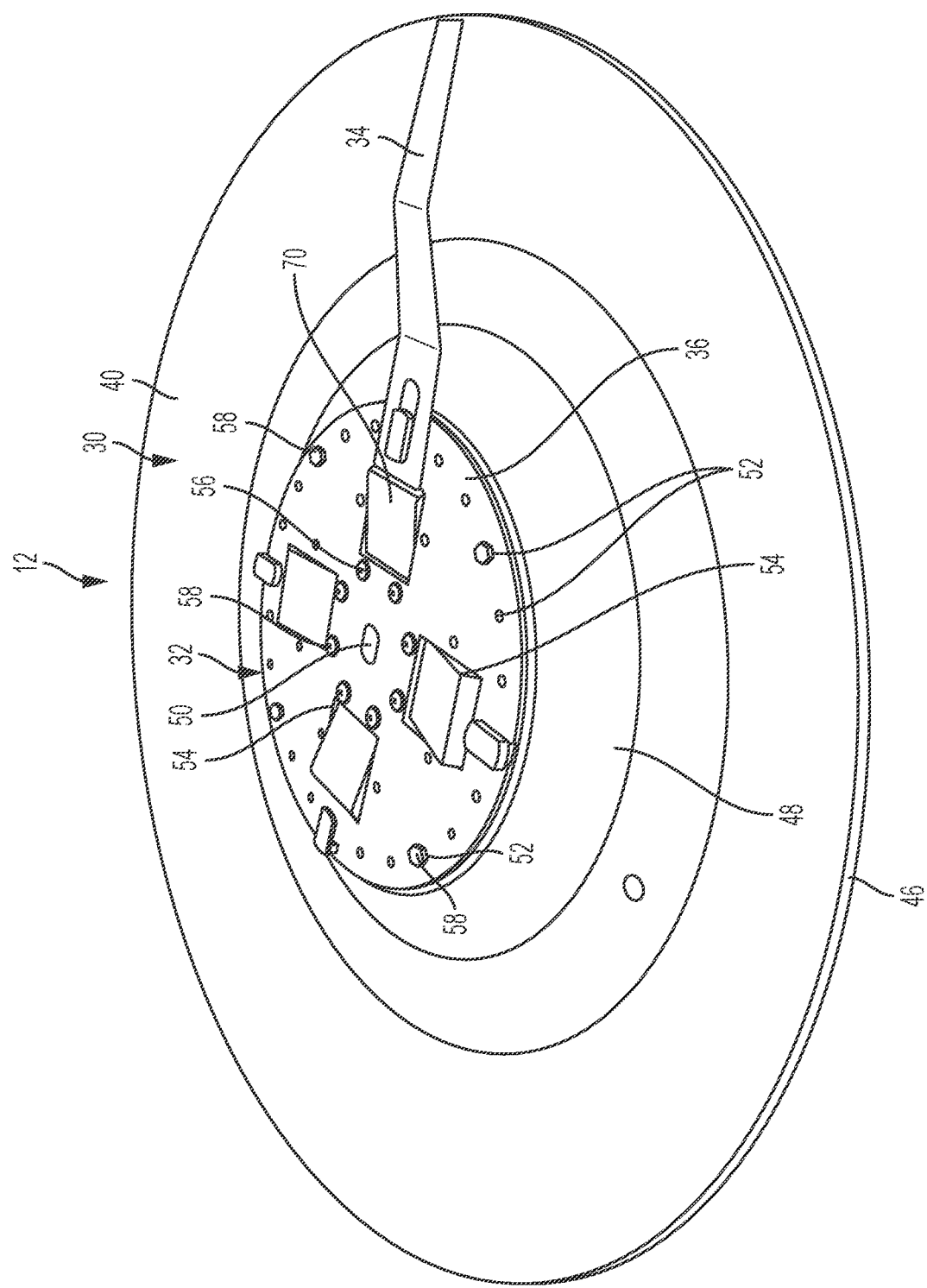
FIG. 4A is a bottom perspective view of the low-energy blade system shown in FIG. 3.
Figure 4B:
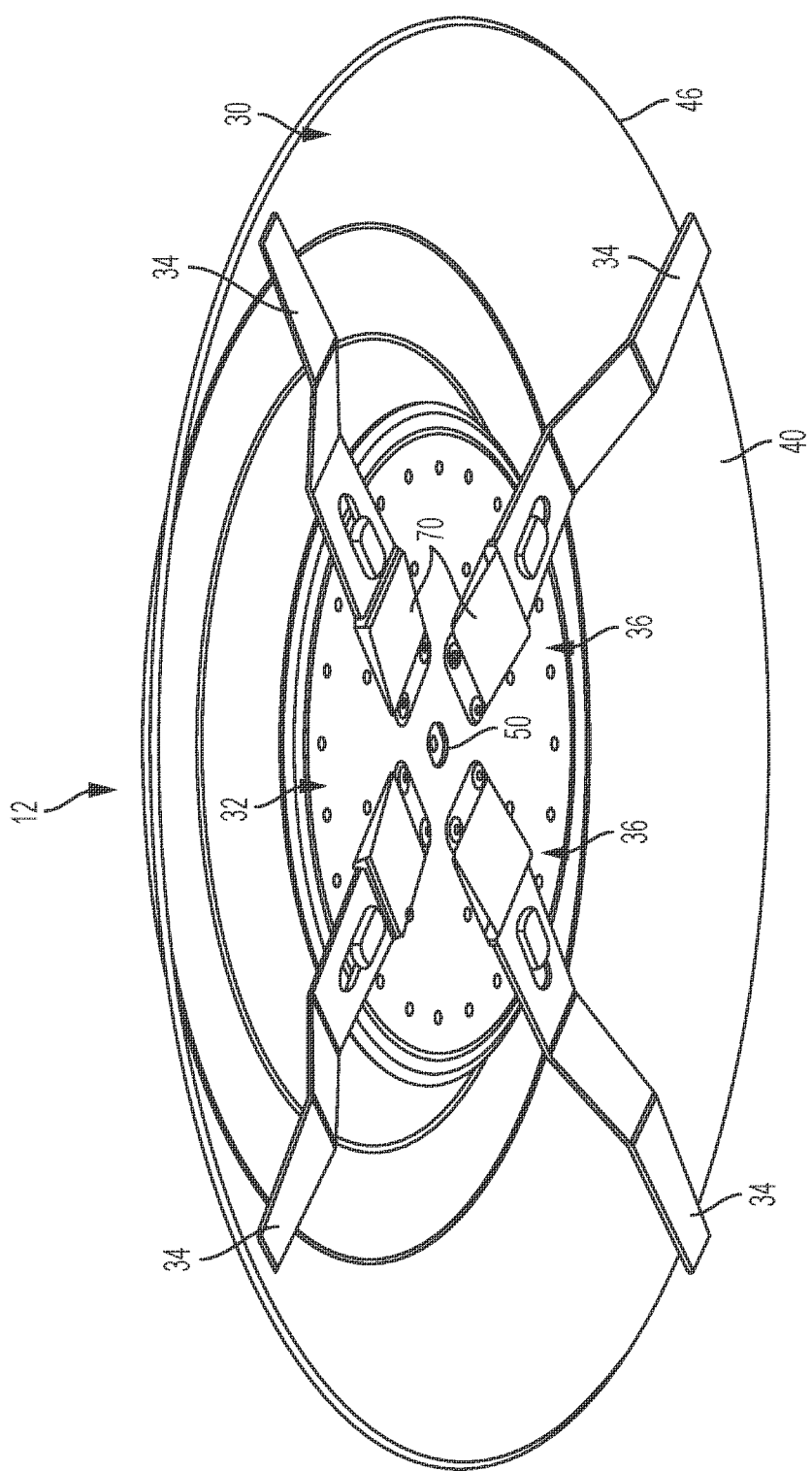
FIG. 4B is another bottom perspective view of the low-energy blade system shown in FIG. 3.
Figure 5:
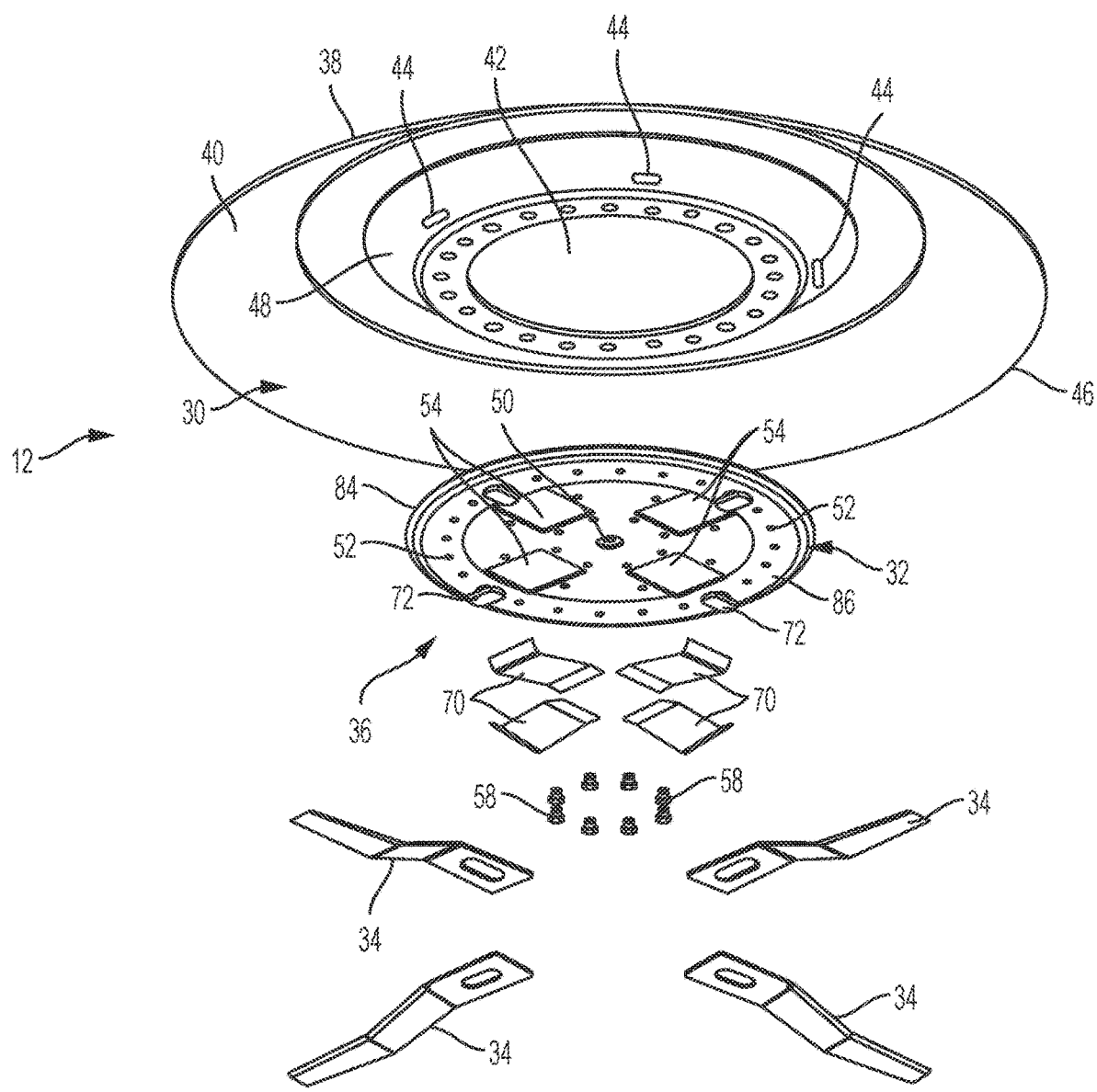
FIG. 5 is an exploded view of the low-energy blade system shown in FIG. 4B.

Referring to FIGS. 1-2, an embodiment of a lawn maintenance tool 10 having a low-energy blade system 12 is shown. The lawn maintenance tool 10 is shown as being a walk-behind mower, but it should be understood by one having ordinary skill in the art that the lawn maintenance tool 10 may also be a riding mower, a stand-on mower, a robotic mower, a manual-powered mower, or any other tool configured to mow a lawn. The lawn maintenance tool 10 includes a power source 14 configured to provide rotational power to the blade system 12. In the illustrated embodiment, the power source 14 is a battery-powered electric motor, but it should be understood by one having ordinary skill in the art that the power source 14 may also be an internal combustion engine, a hybrid-electric motor, or any other power source capable of providing a rotational power output. The power source 14 can be powered by gasoline/fuel, a battery or a plurality of batteries, a combination of gasoline and batteries, an AC-powered electrical adapter for use with an extension cord, any combination thereof or any other similar types of power known in the art. The power source 14 is mounted onto a frame 16, and the power source 14 includes a drive shaft 17 extending through the frame 16. The illustrated exemplary embodiment of the frame 16 for a walk-behind mower includes a deck 18, support bars 20, wheels 22, and a user-operated handle 24. In other embodiments, the frame 16 may include additional parts, different parts, or fewer parts than shown in the illustrated embodiment.

As shown in FIGS. 2-5, an exemplary embodiment of the low-energy blade system 12 includes a shell 30, a mounting plate 32, a plurality of cutting blades 34, and a plurality of quick-attach mechanisms 36 that allow the cutting blades 34 to be easily removed and attached to the mounting plate 32. The blade system 12 is configured to be easily removable and attachable to the lawn maintenance tool 10, and the cutting blades 34 are similarly easily removable and attachable to the blade system 12.

The shell 30 is a generally flexible or semi-rigid member that forms a physical barrier between the frame 16 and the cutting blades 34 as well as the cut grass, as shown in FIGS. 2-5. In another embodiment, the shell 30 is formed as a rigid member. The shell 30 provides protection for the user from cut grass, flying rocks, or other debris as well as helps to guide the cut grass downward toward the ground. The shell 30 includes an upper surface 38, a lower surface 40, a central aperture 42, a plurality of slots 44, and a radial edge 46. The shell 30 is configured to be rotatably driven by the drive shaft 17 extending from the power source 14. The shell 30 is also configured to direct cut grass downwardly toward the ground. The shell 30 is generally formed as an inverted bowl shape having a somewhat W-shaped configuration, when viewed in the cross-section, wherein the central portion 48 of the shell 30 extends downwardly into the space within the shell 30. It should be understood by one having ordinary skill in the art that the shell 30 can have any shape, provided the shell 30 includes a downwardly-directed outer radial edge configured to redirect any cut grass toward the ground. When installed on the lawn maintenance tool 10, the upper surface 38 is directed upwardly, and the lower surface 40 is directed downwardly toward the ground. The power source 14 is positioned adjacent to the upper surface 38 of the shell 30, and the drive shaft 17 of the power source 14 extends downwardly through the central aperture 42 of the shell 30. The radial edge 34 of the shell 30 is generally directed downwardly toward the ground. The plurality of slots 44 formed through the shell 30 are substantially linear slots and are positioned about the central aperture 42 in an evenly spaced-apart manner. In the illustrated exemplary embodiment, the shell 30 includes four (4) slots 44 that are equally spaced about the central aperture 42. The slots 44 are oriented in a tangential manner relative to the radial edge 46 of the shell 30, and the slots 44 are positioned about ninety degrees (90°) relative to each other and relative to the central aperture 42. The slots 44 are configured to receive a portion of the biasing member of the quick-attach mechanism 36, as explained below. The slots 44 are formed through the central portion 48 of the shell 30.

An exemplary embodiment of a mounting plate 32 is shown in FIGS. 2-6. The mounting plate 32 is a generally flat, circular member. In the exemplary embodiment, the mounting plate 32 is formed of a material that is more rigid than the material of the shell 30. In another embodiment, the shell 30 and the mounting plate 32 are formed of the same material. The mounting plate 32 is positioned adjacent to the central portion 48 of the shell 30 and is then attached thereto. The mounting plate 32 includes a central aperture 50 that is generally aligned with the central aperture 42 of the shell 30. The central aperture 50 of the mounting plate 32 is configured to receive the drive shaft 17, wherein rotation of the drive shaft 17 rotates the blade system 12. In an embodiment, the mounting plate 32 further includes a plurality of mounting apertures 52, a plurality of openings 54, and a plurality of attachment apertures 56. The mounting apertures 52 are positioned adjacent to the peripheral edge of the mounting plate 32 and are formed through the thickness thereof. The mounting apertures 52 are configured to receive an attachment mechanism 58 such as a nut-and-bolt, a rivet, or the like for securely attaching the mounting plate 32 to the shell 30. In an embodiment, the mounting plate 32 is permanently secured to the shell 30. In another embodiment, the mounting plate 32 is removably attached to the shell 30 to allow for the removal and repair or replacement of the mounting plate 32. In other embodiments, the mounting plate 32 is interchangeable with other mounting plates 32 to provide attachments for a different number of cutting blades 34.

As shown in FIGS. 2-5, the mounting plate 32 includes a plurality of openings 54 configured to receive a portion of the springs of the quick-attach mechanism 36. The openings 54 of the mounting plate 32 align with the slots 44 of the shell 30 to allow the springs of the quick-attach mechanism 36 to extend therethrough. Each opening 54 is generally formed as a square aperture formed through the thickness of the mounting plate 32, but it should be understood by one having ordinary skill in the art that the openings 54 may be formed as slots or have a rectangular, oval, round, or any other shape so long as the edges of the openings 54 do not interfere with the operation of the quick-attach mechanisms 36. The openings 54 allow the springs to be actuated during the attachment (and removal) of the cutting blades 34, as explained below. The mounting plate 32 includes an opening 54 to correspond with each quick-attach mechanism 36. In the illustrated embodiment, the mounting plate 32 includes four (4) openings 54 that are equally spaced about the rotational axis of the mounting plate 32, but it should be understood by one having ordinary skill in the art that the mounting plate 32 includes at least two openings 54. Further, the mounting plate 32 may include either an odd number of openings 54 or an even number of openings 54 formed therethrough. It should be understood by one having ordinary skill in the art that the openings are equally spaced about the rotational axis of the mounting plate 32 to ensure proper balance of the blade system 12.

The mounting plate 32 further includes a plurality of attachment apertures 56, wherein two (2) attachment apertures 56 are positioned adjacent to each of the openings 54, as shown in FIGS. 2-6. In other embodiments, any number of attachment apertures 56 can be positioned adjacent to corresponding openings 54 in the mounting plate 32. The attachment apertures 56 are configured to allow the springs of the quick-attach mechanisms 36 to be attached to the mounting plate 32. The attachment aperture 56 receive an attachment mechanism 58 formed as a mechanical connector such as a nut-and-bolt, rivet, or the like. The attachment apertures 56 are positioned radially inward relative to the openings 54.

The mounting plate 32 includes a plurality of quick-attach mechanisms 36 that allow for an easy and fast manner for attaching and detaching the cutting blades 34 from the mounting plate 32, as shown in FIGS. 2-6. In other embodiments, the quick-attach mechanisms 36 are connected directly to the shell 30 without the need for the mounting plate 32. The quick-attach mechanisms 36 work in conjunction with the connecting aperture as well as the size and shape of the cutting blades 34 to provide for a toolless connection between the cutting blades 34 and the mounting plate 32, wherein a tool such as a wrench, screwdriver, or any other handheld tool is not necessary to attach or disconnect the cutting blades 34. In an embodiment, each quick-attach mechanism 36 includes a biasing member 70 operatively connected to the mounting plate 32 as well as a cap 72 extending downwardly from the lower surface 86 of the mounting pate 32. The biasing member 70 is configured to bias the cutting blades 34 into being positively attached to the mounting plate 32 when properly attached thereto or, alternatively, to bias the cutting blades 34 away from the mounting plate 32 such that the cutting blades 34 cannot be attached to the mounting plate 32 if the cutting blades 34 are not properly aligned or are not properly connected.

Figure 7:
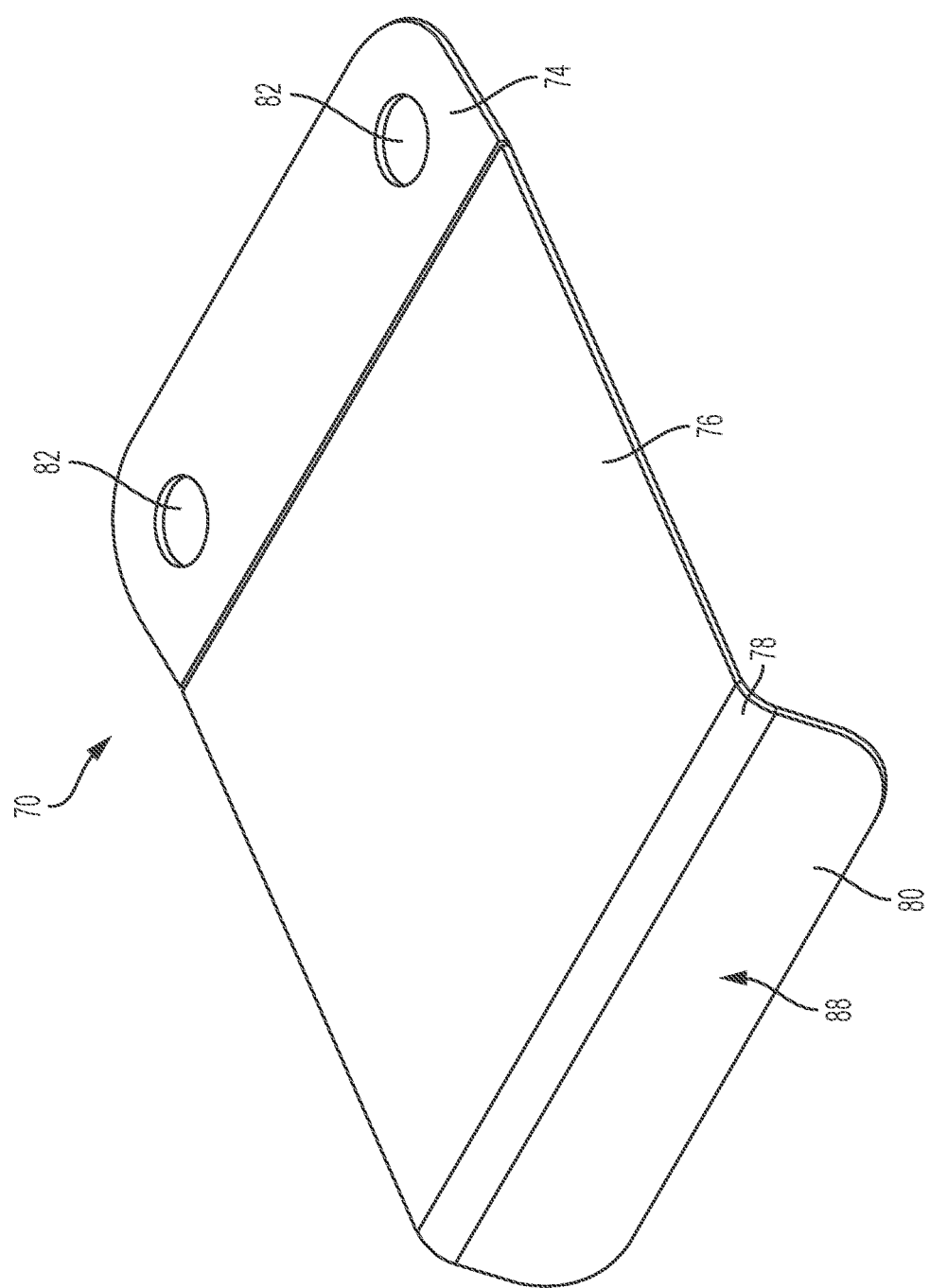
FIG. 7 illustrates a biasing member.

The biasing member 70 is configured as a generally L-shaped spring, as shown in FIG. 7. In an embodiment, the biasing member 70 is metal, but it should be understood by one having ordinary skill in the art that the biasing member 70 may also be formed of plastic or other flexible material that allows the biasing member 70 to act as a spring. The biasing member 70 includes a base 74, a body 76 extending from the base 74, a curved portion 78, and a bearing portion 80. The base 74 of the biasing member 70 is configured as a substantially flat component having a pair of apertures 82 formed through the thickness thereof. The apertures 82 are configured to receive an attachment mechanism 58 for connecting the biasing member 70 to the mounting plate 32. The attachment mechanism 58 can be a nut-and-bold, rivet, or similar mechanical fastener sufficient to connect the biasing member 70 to the mounting plate 32. The biasing member 70 is attached to the mounting plate 32 in a cantilevered manner, wherein the distal end of the biasing member 70—defined by the base 74—is attached to the mounting plate 32 and the remainder of the biasing member 70 extends therefrom. The illustrated embodiment shows the base 74 as having two (2) apertures 82 formed therethrough for attachment to the mounting plate 32, but it should be understood by one having ordinary skill in the art that the mounting plate 32 may include any number of apertures 82 for being attachable the mounting plate 32 using any number of attachment mechanisms 58. The base 74 is attached to the top surface 84 of the mounting plate 32 and extends through the corresponding opening 54 of the mounting plate 32 such that the body 76, curved portion 78, and bearing portion 80 are generally positioned below the lower surface 86 of the mounting plate 32.

The body 76 of the biasing member 70 of each quick-attach mechanism 36 extends from the base 74 at an angle, as shown in FIG. 7. The body 76 is a generally flat component that is integrally connected with the base 74. It is the angle formed between the base 74 and the body 76 that provides the spring action when the biasing member 70 is actuated. The body 76 extends downwardly (directionally, when the blade system 12 is attached to a lawn maintenance tool 10) below the lower surface 86 of the mounting plate 32. One distal end of the body 76 is integrally formed with the base 74, and the opposing distal end of the body 76 is integrally formed with the curved portion 78. The curved portion 78 extends from the body 76 in a curved manner, wherein the curved portion 78 is curved upwardly toward the lower surface 86 of the mounting plate 32. The curved portion 78 connects the body 76 and the bearing portion 80, wherein the bearing portion 80 extends from the curved portion 78 at an angle relative to the body 76. While the body 76 of the biasing member 70 extends away from the lower surface 86 of the mounting plate 32, the bearing portion 80 extends toward (and beyond) the lower surface 86 of the mounting plate 32. The bearing portion 80 is configured to move into and out of the corresponding slot 44 during actuation of the biasing member 70, as will be explained below. When actuated, the biasing member 70 rotates about the transition between the body 76 and the base 74 such that the bearing portion 80 moves toward the shell 30. The bearing portion 80 includes a bearing surface 88 that is configured to contact the cutting blade 34 and bias the cutting blade 34 either into engagement when properly aligned during attachment or into disengagement when not properly aligned during attachment.

Figure 6:
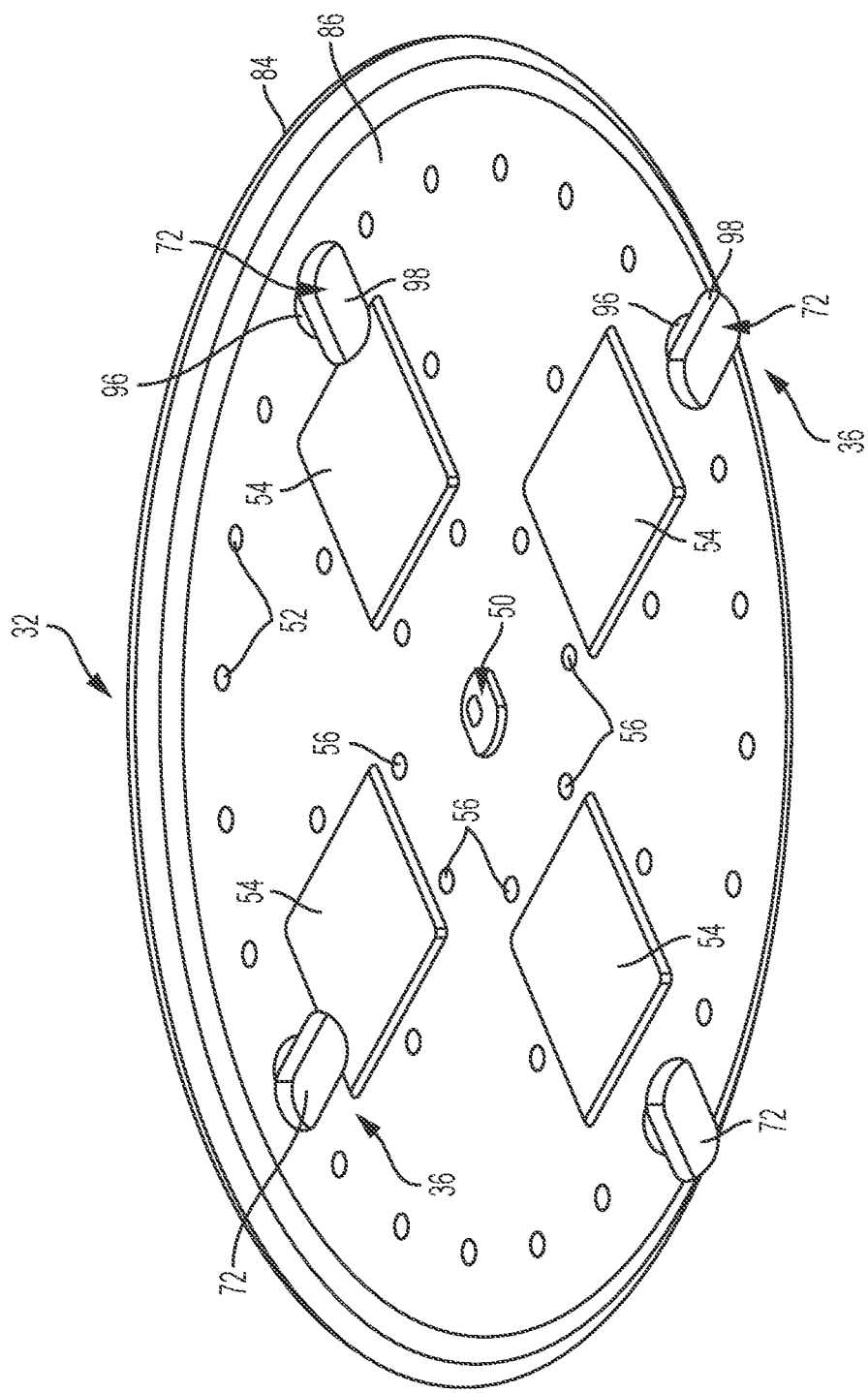
FIG. 6 is a bottom perspective view of a mounting plate.

In an embodiment, the caps 72 of the quick-attach mechanisms 36 extend downwardly from the lower surface 86 of the mounting plate 32, as shown in FIG. 6. Each cap 72 includes a post 96 and a plate 98, wherein the post 96 is attached to the mounting plate 32 and the plate 98 is attached to the opposing distal end of the post 96. The post 96 is a generally cylindrical member that is integrally formed with the mounting plate 32. In an embodiment, the post 96 is attached to the mounting plate 32 by way of a weld or other means for permanently attaching the post 96 to the mounting plate 32. The plate 98 is oriented generally parallel to the lower surface 86 of the mounting plate 32. The plate 98 is a generally oval-shaped member. It should be understood by one having ordinary skill in the art that the plate 98 can be formed of any shape. The oval shape of the plate 98 requires a corresponding oval-shaped aperture formed through the cutting blade 34 which allows the cutting blade 34 to slide over and past the plate 98, as will be described below. The caps 72 are configured to allow a cutting blade 34 to be releasably attachable thereto. The plate 98 is spaced apart from the mounting plate 32 a distance that is substantially the same as the thickness of the cutting blade 34—or just slightly larger—to reduce or eliminate shaking movement of the cutting blade 34 relative to the mounting plate 32. The plate 98 is sized and shaped to be received by the aperture 100 formed through the cutting blade 34.

Figure 8:
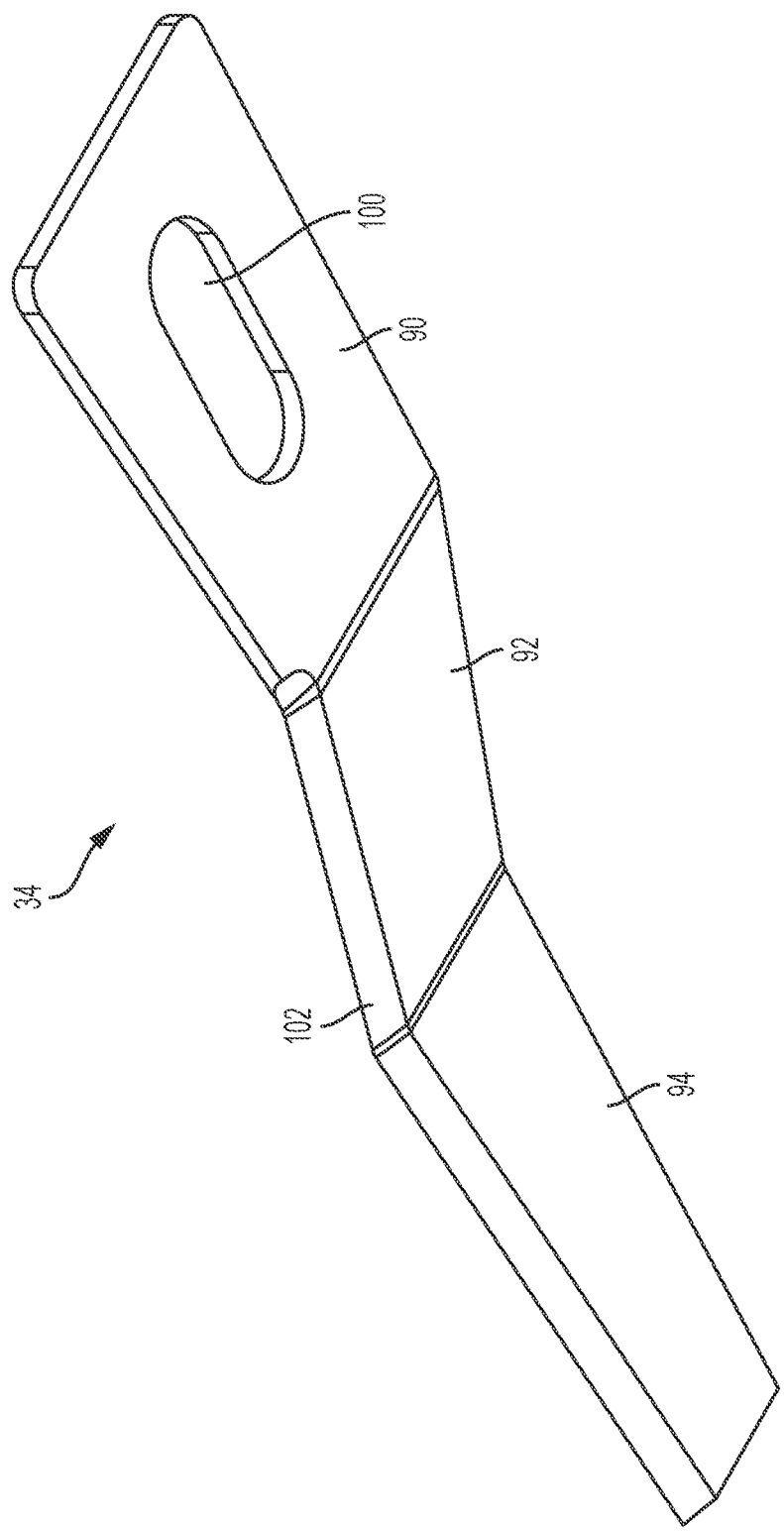
FIG. 8 illustrates a cutting blade.

As shown in FIG. 8, an exemplary embodiment of a cutting blade 34 is shown. The cutting blade 34 is a generally elongated Z-shaped blade having a mounting portion 90, a transition portion 92, and a tip portion 94. The mounting portion 90 is formed as a flat portion having an aperture 100 formed therethrough. The aperture 100 is formed as an elongated oval shape, wherein the aperture 100 is shaped to correspond to the shape of the plate 98 of the cap 72. It should be understood by one having ordinary skill in the art that the aperture 100 of the cutting blade 34 is formed as substantially the same size and shape as the plate 98 of the cap 72 to which it is attached. The elongated shape of the aperture 100 allows the cutting blade 34 to receive the plate 98 of the cap 72 such that once the cutting blade 34 passes the plate 98, the post 96 of the cap 72 is slidable along the length of the aperture 100. This sliding movement of the post 96 within the aperture 100 ensures that the cutting blade 34 is properly attached during operation due to the centrifugal force that causes the cutting blade 34 to move radially outward relative to the post 96 until the post 96 contacts the distal end of the aperture 100. The transition portion 92 extends from the mounting portion 90 at an angle therefrom, wherein the transition portion 92 extends away from the lower surface 40 of the shell 30. The tip portion 94 extends from the transition portion 92 at an angle thereto, wherein the tip portion 94 and the mounting portion 90 are substantially parallel relative to each other. The cutting blade 34 includes a sharpened leading edge 102 configure to cut grass as the blade system 12 is rotated. When the cutting blades 34 are properly installed on the blade system 12, the distal end of the tip portion 94 is positioned adjacent to the radial edge 46 of the shell 30. In an embodiment, the distal end of the tip portion 94 is positioned radially inward relative to the radial edge 46 of the shell 30.

In another embodiment, the blade system 12 includes a shell 30 and a plurality of quick-attach mechanisms 36 connected directly to the shell 30, wherein the caps 72 extend downwardly from the lower surface of the shell 30. The biasing members 70 are connected to the shell 30 such that the cantilevered end of each biasing member 70 extends through a corresponding slot 44 in the shell 30. The cutting blades 34 being releasable to the caps 72 extending from the shell 30.

In operation, the cutting blades 34 are operatively connected to the blade system 12 by way of the quick-attach mechanism 36, as shown in FIGS. 9A-9C. The cutting blade 34 is first positioned adjacent to the cap 72 of the quick-attach mechanism 36 such that the aperture 100 of the cutting blade is aligned with the cap 72, as shown in FIG. 9A. The cutting blade 34 is then pushed toward the mounting plate 32, wherein the cap 72 of the quick-attach mechanism 36 is received in the aperture 100 of the cutting blade 34, as shown in FIG. 9B. Further, the mounting portion 90 of the cutting blade 34 contacts the body 76 and curved portion 78 of the biasing member 70, and as the cutting blade 34 is moved toward the mounting plate 32 the biasing member 70 is actuated by bending and rotating in a cantilevered manner. If the cutting blade 34 is not fully attached to the cap 72, the biasing member 70 biases the cutting blade 34 away from the mounting plate 32 such that the cutting blade is disengaged from the cap 72. As the biasing member 70 is actuated, the bearing portion 80 extends through the corresponding slot 44 of the shell 30. Once the cutting blade 34 has been pushed until it is flush with the mounting plate 32, the cutting blade 34 is then pulled radially toward the radial edge 46 of the shell 30 until the post 96 of the cap 72 contacts the end of the elongated aperture 100 formed through the cutting blade 34, as shown in FIG. 9C. As the cutting blade 34 is slide radially outward, the mounting portion 90 of the cutting blade 34 slides along the body 76 and curved portion 78 of the biasing member 70 after which the distal end of the cutting blade 34 slides along the bearing surface 88 of the bearing portion 80. In this position, the cutting blade 34 is positively attached to the quick-attach mechanism 36 extending from the mounting plate 32, and the spring bias generated at the curved portion 88 of the biasing member 70 continually pushes radially against the edge at distal end of the cutting blade 34. This radial bias from the biasing surface 88 against the cutting blade 34 ensures continuous attachment between the cutting blade 34 and the mounting plate 32. This radial bias also prevents accidental disconnection of the cutting blade 34 by preventing the cutting blade from 34 sliding radially toward the central aperture 50 of the mounting plate 32. The mounting portion 90 of the cutting blade 34 is sandwiched between a portion of the cap 98 and the mounting plate 32 to reduce or eliminate any "bounce" at the distal end of the tip portion 94.

The cutting blade 34 is removed by actuating—or pressing—the biasing member 70 toward the mounting plate 32, thereby removing the radial bearing force applied to the cutting blade 34 and effectively disengaging the cutting blade 34 from the biasing member 70. The cutting blade 34 is then slid radially inward toward the central aperture 50 of the mounting plate until the entire plate 98 of the cap 72 is aligned with the aperture 100 of the cutting blade 34. At this point, the cutting blade 34 can be removed from the quick-attach mechanism 36.

The quick-attach mechanism 36 allows the cutting blades 34 to be releasably attachable to the mounting plate 32 without the use of any handheld tools or other tool separate from the cutting system 12.

Figure 10A:
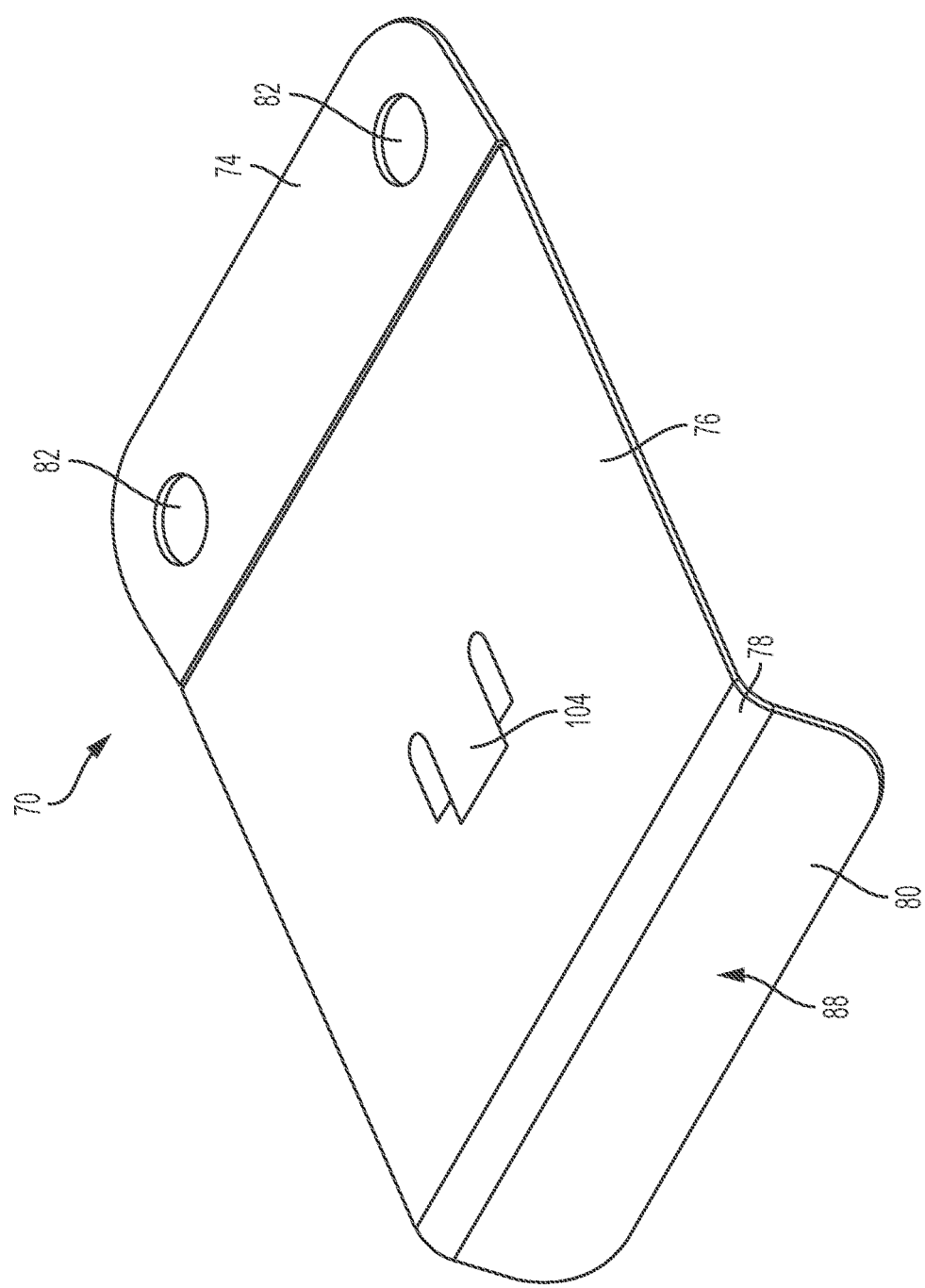
FIG. 10A illustrates another embodiment of a biasing member.
Figure 10B:
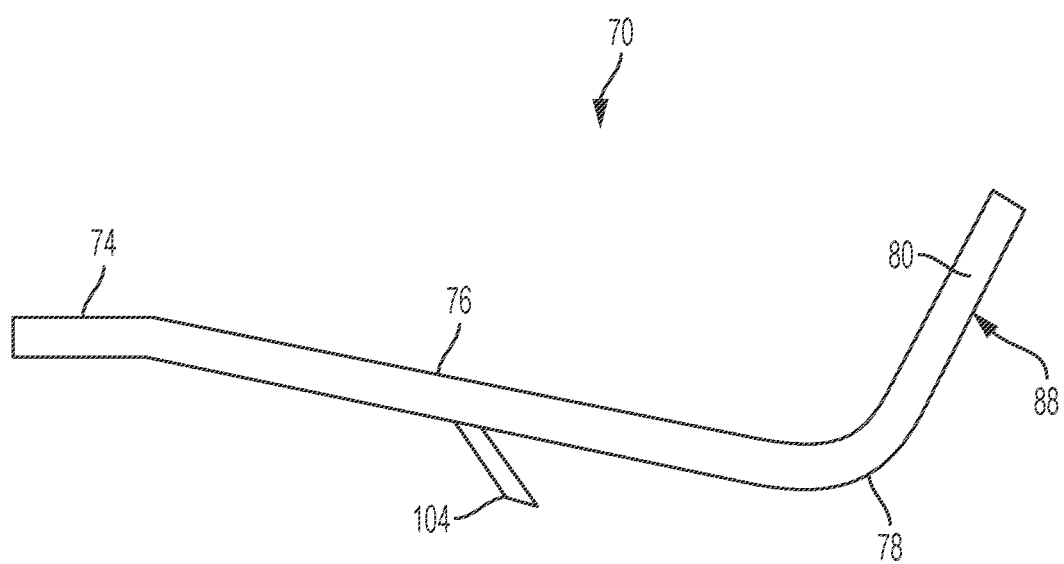
FIG. 10B is a side view of the biasing member shown in FIG. 10A.

In another embodiment, the biasing member 70 includes a tab 104 wherein, when the biasing member 70 is attached to the mounting plate 32, the tab 104 extends downwardly away from the mounting plate 32, as shown in FIG. 10. This tab 104 is configured to contact the mounting portion 90 of the cutting blade 34 when the cutting blade 34 is pushed toward the mounting plate 32 (similar to FIG. 9B) and when the cutting blade 34 is improperly aligned. The cutting blade 34 is improperly aligned, for example, when the tip portion 94 of the cutting blade 34 is pointed radially inward instead of radially outward toward the radial edge 46 of the shell 30. The tab 104 effectively prevents mis-alignment or mis-attachment of the cutting blade 34 to the mounting plate 32 because the tab 104 does not allow the mounting portion 90 of the cutting blade 34 to become flush (or parallel) to the lower surface 86 of the mounting plate 32.

The blade system 12 provides a weight reduction compared to conventional single-blade cutting systems for lawn mowers. The cutting blades 34 of the blade system 12 are much smaller than typical single cutting blades attached to a spindle or driveshaft, and the cutting blades 34 of the blade system 12 are also attached to the mounting plate 32 at a position spaced radially away from the rotational axis of the driveshaft 17. The cutting blades 34 are also sized smaller than conventional single-blade designs. The reduced weight of the cutting blades 34 and the blade system 12 reduces the amount of torque and energy necessary to rotate the blade system 12. As a result of the reduced weight of the blade system 12 and the energy needed to rotate the blade system 12, a lower-powered power source 14, such as an electric motor, can be used to provide rotational power to the blade system 12. The use of an electric motor provides the additional benefit of reduced noise during operation. In addition, the reduced size of the cutting blades 34 reduces the noise generated as the cutting blades 34 rotate within the shell 30. The blade system 12 described herein also allows for a reduced depth of the shell 30 compared to typical cutting decks that house a full single-blade cutting system.

While preferred embodiments of the present invention have been described, it should be understood that the present invention is not so limited and modifications may be made without departing from the present invention. The scope of the present invention is defined by the appended claims, and all devices, processes, and methods that come within the meaning of the claims, either literally or by equivalence, are intended to be embraced therein.

What is claimed is:

1. A low-energy blade system for a lawn maintenance tool, said blade system comprising:
    a shell having an upper surface and a lower surface;
    a circular mounting plate attached to said lower surface of said shell, said mounting plate includes a plurality of caps, wherein each of said plurality of caps includes a post connected to said mounting plate and a plate attached to an end of said post, said plate being an elongate-shaped member having parallel sides of uniform width that is oriented substantially parallel to the mounting plate and oriented radially outward from a center axis of said mounting plate;
    a plurality of cutting blades each having an elongate aperture having parallel sides of uniform width, wherein said elongate aperture is configured to receive the elongate-shaped member of said plate, each blade being releasably attachable to one of said caps of said mounting plate, and wherein the elongate aperture is oriented along a direction parallel to the orientation of the elongate-shaped member of said plate when the blade is attached to the cap of the mounting plate; and
    a plurality of biasing members attached to said mounting plate, wherein each of said biasing members biases one of said plurality of cutting blades into a positive attachment with said mounting plate.

2. The blade system of claim 1, wherein each biasing member is attached to said mounting plate in a cantilevered manner.

3. A low-energy blade system for a lawn maintenance tool, said blade system comprising:
    a shell having an upper surface and a lower surface;
    a plurality of caps operatively connected to said lower surface of said shell, wherein each of the plurality of caps includes a post and a plate, wherein the plate is an elongate-shaped member that is oriented substantially parallel to the mounting plate and oriented radially outward from a center axis of said shell, wherein the plate has curved ends and side portions of uniform width;

a plurality of cutting blades each having an elongate aperture, wherein said elongate aperture is configured to receive the elongate-shaped member of said plate, each blade releasably attachable to one of said caps, wherein the elongate aperture has curved ends and side portions of uniform width; and a plurality of biasing members operatively connected to said shell, wherein each of said biasing members biases one of said plurality of cutting blades into a positive attachment with one of said plurality of caps, wherein the biasing members are L-shaped with a body and an upwardly extending bearing portion.

4. The blade system of claim 3, further comprising a mounting member attached to said lower surface of said shell.

5. The blade system of claim 4, wherein said plurality of caps extend from said mounting member.

6. The blade system of claim 4, wherein said post extends from said mounting member and said plate is attached to a distal end of said post opposite said mounting member.

7. The blade system of claim 3, wherein each of said plurality of biasing members includes a bearing surface for biasing said cutting blade into engagement with one of said caps during attachment.

* * * * *